United States Patent [19]

Kitamura

[11] Patent Number: 5,417,899
[45] Date of Patent: May 23, 1995

[54] INJECTION COMPRESSION MOLDING METHOD FOR COMPACT DISCS OR THE LIKE

[75] Inventor: Takehiko Kitamura, Chiba, Japan

[73] Assignee: Sumitomo Heavy Industries, Ltd., Tokyo, Japan

[21] Appl. No.: 183,258

[22] Filed: Jan. 19, 1994

Related U.S. Application Data

[63] Continuation of Ser. No. 605,305, Oct. 30, 1990, abandoned.

[30] Foreign Application Priority Data

Nov. 1, 1989 [JP] Japan .................................. 1-283043

[51] Int. Cl.⁶ .................... B29C 45/56; B29C 45/76
[52] U.S. Cl. ................... 264/40.5; 264/328.7; 425/149; 425/150
[58] Field of Search .................... 264/40.1, 40.5, 328.7, 264/328.9, 328.11; 425/149, 150, 156, 160, 167, 574

[56] References Cited

U.S. PATENT DOCUMENTS

| | | | |
|---|---|---|---|
| 4,131,596 | 12/1978 | Allen | 264/40.5 |
| 4,863,651 | 9/1989 | Koten | 264/40.5 |
| 4,917,840 | 4/1990 | Harada et al. | 264/40.5 |
| 5,002,706 | 3/1991 | Yamashita | 264/328.7 |

FOREIGN PATENT DOCUMENTS

| | | |
|---|---|---|
| 0235800 | 9/1987 | European Pat. Off. . |
| 2607440 | 3/1988 | France . |
| 61-83016 | 4/1985 | Japan . |
| 60-97819 | 5/1985 | Japan . |
| 61-205112 | 9/1986 | Japan . |
| 62-68722 | 3/1987 | Japan . |
| 62-198428 | 9/1987 | Japan . |
| 63-94806 | 4/1988 | Japan . |
| 2213288 | 9/1989 | United Kingdom . |

*Primary Examiner*—Jill L. Heitbrink
*Attorney, Agent, or Firm*—Nikaido, Marmelstein, Murray & Oram

[57] ABSTRACT

An injection compression molding method for compact discs or the like, includes the step of changing the clamping pressure or compression pressure, after the internal cavity pressure in the mold after injection has reached its peak, stepwise or continuously as the cooling proceeds, thereby making the applied pressure per unit area with respect to the effective pressure range constant. In a compact disc formed by this method, the residual stress after cooling is uniform, so that its optical properties are improved substantially.

7 Claims, 3 Drawing Sheets

INJECTION COMPRESSION MOLDING METHOD FOR COMPACT DISCS OR THE LIKE

This application is a continuation of application Ser. No. 07/605,305, filed Oct. 30, 1990, now abandoned.

BACKGROUND OF THE INVENTION

1. Field of the Invention

This invention relates to an injection compression molding method for compact discs or the like, and in particular, to an injection compression molding method which copes with the problem of residual stresses, which problem occurs as the production cycle for compact discs or the like is shortened.

2. Description of the Related Art

In the production of compact discs, for example, it has been the common practice to provide a sufficient length of cooling time, approximately 6 to 8 seconds, when cooling each optical disc base with a view to mitigating the various stresses involved, i.e., filling pressure, dwell pressure, clamping pressure, compression pressure, etc. To reduce the production costs, however, it is necessary to shorten the above-mentioned cooling time. In view of this, various attempts have been made to improve the cooling efficiency. Examples of such attempts include: bringing the cooling water channel nearer to the disc surface; widening the channel so as to increase the water flow; and selecting a mold material which has a higher heat conductivity. These arrangements, on the other hand, have not been without their problems: the disc surface layer is apt to become hardened at an early stage; a difference in stress is apt to be generated between the inside and the exterior surface portion of the disc; and the optical properties of the disc, such as birefringence, are deteriorated.

SUMMARY OF THE INVENTION

It is accordingly an object of this invention to provide an injection compression molding method which makes it possible to effectively eliminate or mitigate residual stresses in a compact disc even when the cooling time for the disc is as-short as 4 seconds or less, without deteriorating the optical properties of the disc, such as birefringence.

In accordance with this invention, the clamping pressure or compression pressure in a system which allows this pressure to be changed during clamping is changed, after the internal cavity pressure in the mold after injection has reached its peak, stepwise or continuously as the cooling proceeds, thereby making the applied pressure per unit area with respect to the effective pressure range constant.

The cooling process may be controlled by controlling the time and pressure stepwise or by a ramp function control method.

DETAILED DESCRIPTION OF THE PREFERRED EMBODIMENTS

What is indispensable to this invention is a compression press injection molding machine of the type in which the clamping force can be arbitrarily changed during the period between the time when the clamping is completed and the time when the opening of the mold is started, i.e., a straight hydraulic mold clamping system. It might also be possible to adopt a toggle type mold clamping system. In that case, however, the system must be capable of generating the clamping force by hydraulic means or the like and adjusting the generated clamping force over a period of time (as with Hydrobalancer manufactured by the applicant of the present patent application), or it must be equipped with a core press type injection clamping device.

Figure 2:
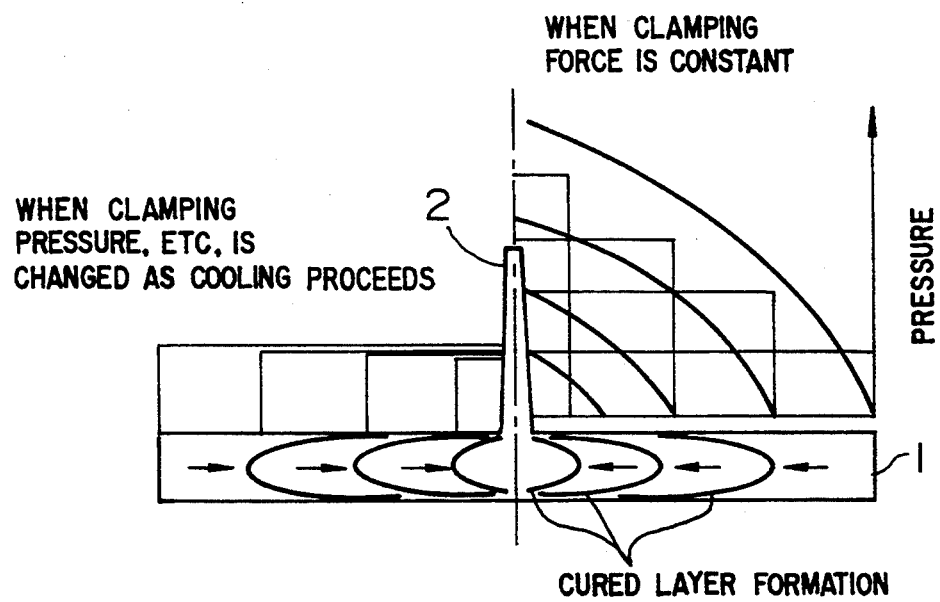
FIG. 2 is a drawing showing the way in which the compact disc is cooled.

Generally speaking, the cooling of a material is gradually effected, starting from the flow end portion and advancing toward the gate. In the case of the molding of a compact disc, the cooling is effected in a manner as indicated by the arrows of FIG. 2 (in which the reference numeral 1 indicates a cavity for molding compact discs and the reference numeral 2 indicates a gate). When pressed with a constant clamping pressure or compression pressure, the effective pressure range decreases gradually as the cooling proceeds, so that the pressure applied to a unit area becomes higher. If, in this condition, the disc is released from the mold without having been cooled to sufficient degree, a difference in stress is generated between the surface portion and the inside portion of the disc, with the result that the residual stresses exist in the disc in an irregular manner, which leads to dispersion in birefringence (which is one of the optical properties of the disc) or an excessively large degree of change in the disc properties with passage of time.

To solve these problems, it is necessary to improve the optical properties of the disc such as birefringence by changing the clamping pressure or the compression pressure stepwise or continuously as the cooling proceeds to make the applied pressure per unit area constant with respect to the effective pressure range thereby to remove the residual pressure or make it constant.

Figure 1:
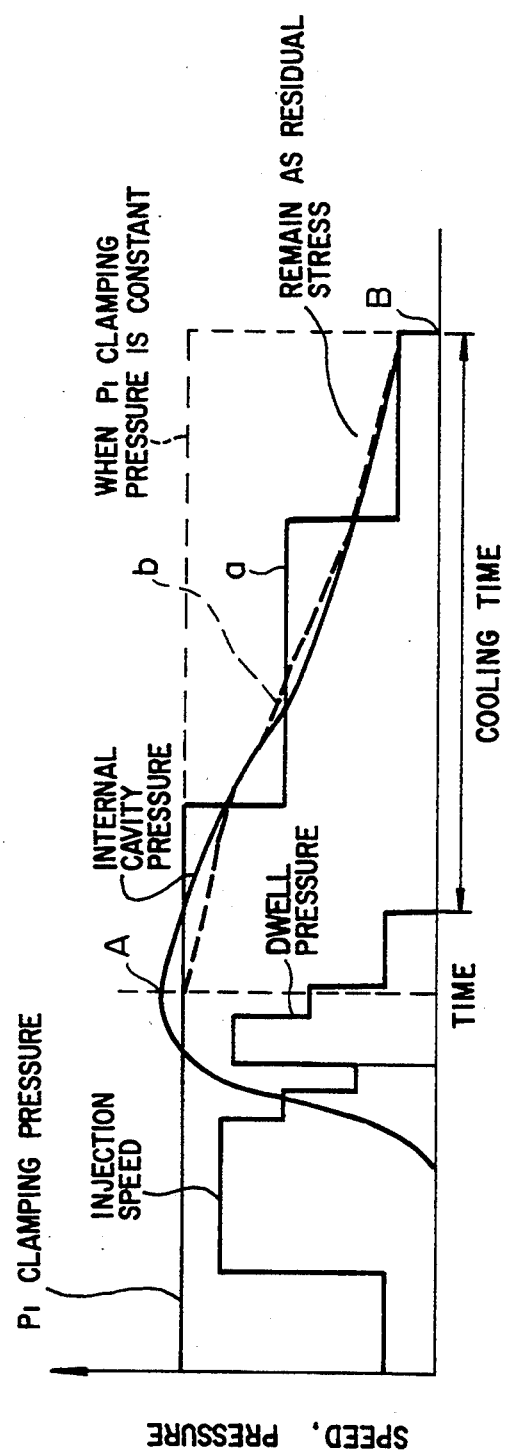
FIG. 1 is a graph showing the control system of this invention.

The control operation for removing residual pressure is performed particularly during the period between the time when the internal cavity pressure is at its peak (see the reference symbol A in FIG. 1), which approximately corresponds to the termination of the filling and the initial stage of dwell pressure, and the time when the opening of the mold is started (see the reference symbol B of FIG. 1). Before that, there is no problem whether it is higher or lower than the clamping pressure or compression pressure at its peak.

Figure 3:
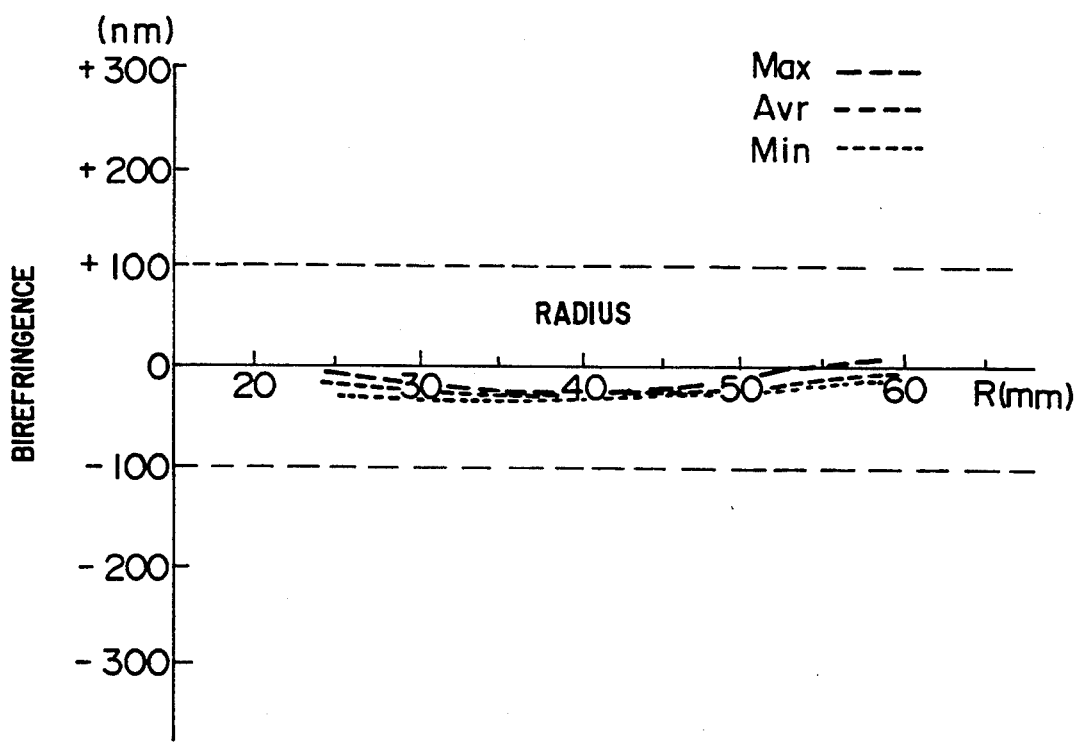
FIG. 3 is a graph showing the birefringence profile when the control process according to this invention is adopted.
Figure 4:
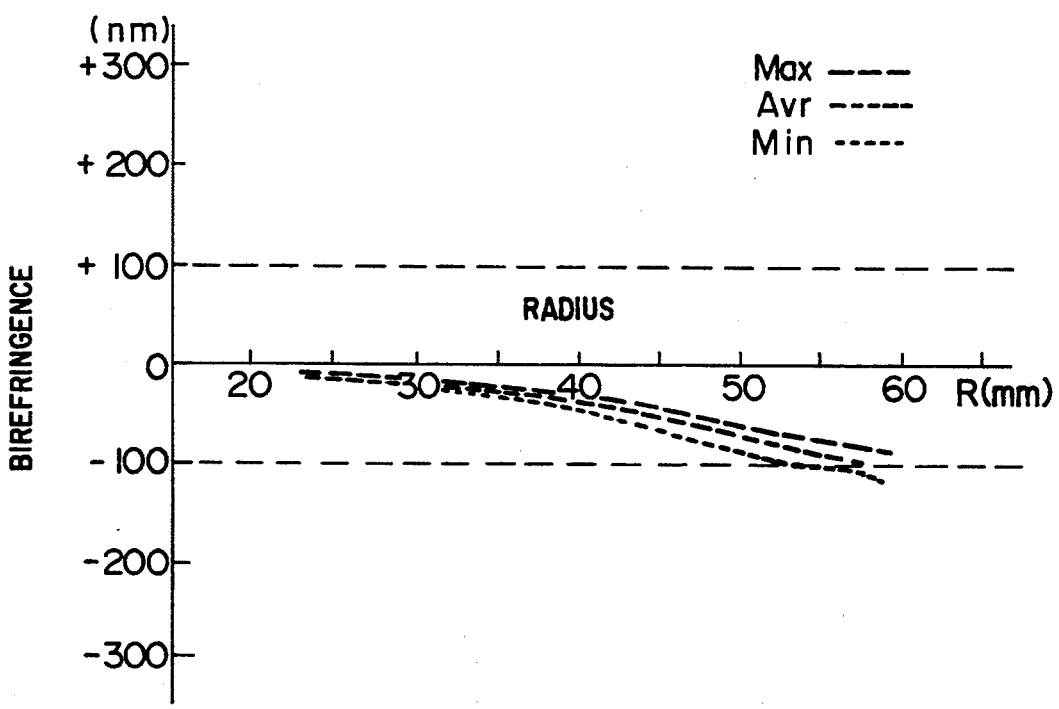
FIG. 4 is a graph showing the birefringence profile when the clamping force is constant as in the prior art.

After the internal cavity pressure has reached at its peak, it is necessary to control the time and pressure stepwise as indicated by the reference symbol a in FIG. 1, or a continuous ramp function control has to be effected (as indicated by the reference symbol b in FIG. 1). FIG. 1 shows a concrete example of the control process flow and FIG. 3 shows the birefringence profile of a molding obtained through this control process. FIG. 4 shows the birefringence profile of a molding obtained under a constant clamping force. As is apparent from these two graphs, the molding obtained through the control process of this invention exhibits a uniform birefringence profile (FIG. 3).

Thus, in accordance with this invention, the clamping pressure is changed, after the internal cavity pressure in the mold after injection has reached its peak, stepwise or continuously as the cooling proceeds, thereby making the applied pressure per unit area with respect to the effective pressure range constant.

By thus controlling the cooling process, the residual stress in the compact disc after cooling is removed or made uniform, thereby substantially improving the optical properties of the molding, as shown in FIG. 3.

What is claimed is:

1. An injection compression molding method for producing optical compact discs using an injection molding apparatus which has a mold having a mold cavity and which can exert a controllably variable compression pressure on said mold to vary internal cavity pressure in said mold cavity, comprising the steps of:
    injecting a moldable liquid material into said mold cavity while applying a first predetermined compression pressure on said mold;
    applying a dwell pressure to said moldable liquid material in said mold cavity after said mold cavity is fully filled with said moldable liquid material;
    controlling the compression pressure on said mold while cooling said moldable liquid material, after the internal cavity pressure in the mold after injection has reached its peak at a time approximately when said injection stage is terminated and said dwell stage is initiated, such that the pressure per unit area applied to the moldable material is substantially constant with respect to the effective pressure applied to an unhardened portion of said moldable material to produce an optical compact disc having generally uniform residual stress.

2. An injection compression molding method according to claim 1, wherein said compress ion pressure is varied in a stepped manner as a function of time and pressure.

3. An injection compression molding method according to claim 1, wherein said compression pressure is varied using a ramp function control method.

4. An injection compression molding method according to claim 1, wherein said injection molding apparatus is a straight hydraulic mold clamping system.

5. An injection compression molding method according to claim 1, wherein said injection molding apparatus is a core press type injection clamping device.

6. An injection compression molding method according to claim 1, wherein said injection molding apparatus is a toggle type mold clamping system.

7. An injection compression molding method for producing optical compact discs using an injection molding apparatus which has a mold having a mold cavity and which can exert a controllably variable compression pressure on said mold to vary internal cavity pressure in said mold cavity, comprising the steps of:
    injecting a moldable liquid material into said mold cavity while applying a first predetermined compression pressure on said mold;
    applying a dwell pressure to said moldable liquid material in said mold cavity after said mold cavity is fully filled with said moldable liquid material;
    controlling the compression pressure on said mold while cooling said moldable liquid material, after the internal cavity pressure in the mold after injection has reached its peak at a time approximately when said injection stage is terminated and said dwell stage is initiated, such that the pressure per unit area applied to the moldable material is substantially constant with respect to the effective pressure applied to an unhardened portion of said moldable material to produce an optical compact disc having generally uniform residual stress and having a substantially uniform birefringence profile.

* * * * *